US006154143A

United States Patent [19]
Robinson

[11] Patent Number: 6,154,143
[45] Date of Patent: Nov. 28, 2000

[54] PORTABLE METEOROLOGICAL INFORMATION SYSTEM

[75] Inventor: Bruce R. Robinson, Sandia Park, N. Mex.

[73] Assignee: Belfort Instrument, Inc., Baltimore, Md.

[21] Appl. No.: 09/397,786

[22] Filed: Sep. 16, 1999

[51] Int. Cl.[7] .................................................. G01N 1/00
[52] U.S. Cl. ........................ 340/601; 340/584; 340/602; 340/611; 701/14; 364/420; 364/434; 364/443
[58] Field of Search .................................. 340/601, 602, 340/611, 584, 949, 945, 968, 959, 972; 701/14; 702/3; 455/45; 342/26; 364/420, 443, 424.013, 434

[56] References Cited

U.S. PATENT DOCUMENTS

| | | | |
|---|---|---|---|
| 3,552,687 | 1/1971 | Howard et al. | 244/77 |
| 3,621,212 | 11/1971 | Hobbs et al. | 235/150.27 |
| 3,648,230 | 3/1972 | Younkin | 340/979 |
| 3,851,159 | 11/1974 | Games et al. | 235/150.27 |
| 3,857,032 | 12/1974 | Van Englehoven | 250/231 R |
| 4,197,543 | 4/1980 | Lewis | 343/112 R |
| 4,343,035 | 8/1982 | Tanner | 364/453 |
| 4,642,775 | 2/1987 | Cline et al. | 364/443 |
| 4,740,899 | 4/1988 | McElreath | 364/434 |
| 4,812,990 | 3/1989 | Adams | 364/444 |
| 5,023,934 | 6/1991 | Wheeless | 455/45 |
| 5,105,191 | 4/1992 | Keedy | 340/968 |
| 5,111,400 | 5/1992 | Yoder | 364/424.01 |
| 5,379,215 | 1/1995 | Kruhoeffer et al. | 364/420 |
| 5,434,565 | 7/1995 | Simon et al. | 340/949 |
| 5,517,193 | 5/1996 | Allison et al. | 342/26 |
| 5,568,385 | 10/1996 | Shelton | 364/420 |
| 5,615,118 | 3/1997 | Frank | 364/424.013 |
| 5,757,322 | 5/1998 | Ray et al. | 342/460 |
| 5,850,619 | 12/1998 | Rasmussen et al. | 702/3 |
| 5,920,827 | 7/1999 | Baer et al. | 702/3 |
| 5,999,882 | 12/1999 | Simpson et al. | 702/3 |

OTHER PUBLICATIONS

Gleim, Irvin N., Ph.D., CFII, *Private Pilot Handbook*, Third Edition, Aug., 1989, pp. 109, 165–167, 174–183, 187, 200, Aviation Publications, Inc., Gainesville.

*Primary Examiner*—Benjamin C. Lee
*Assistant Examiner*—Phung Nguyen
*Attorney, Agent, or Firm*—Rod D. Baker

[57] ABSTRACT

A meteorological information system useable by aircraft pilots and others. A receiver-calculator unit receives raw meteorological data and site-specific physical data from a ground-based weather station having a signal transmitter for broadcasting signals conveying data about weather conditions at the station. The transmitted raw data signals are received by the receiver-calculator unit in the aircraft. The receiver-calculator unit may feature an input with which the operator inputs information about the physical character, such as the heading, of the runway of interest. The receiver-calculator unit processes both received raw weather data and received site-specific physical data, and/or operator-input data, to derive additional meteorological information. The raw and derived weather conditions information is displayed by the unit to be available to the aircraft pilot during landing or take-off maneuvers. Optionally, the apparatus uses known algorithms for determining aircraft performance characteristics to process raw and derived weather and site-specific data to determine the relative safety of proposed aircraft maneuvers, such as take-off.

19 Claims, 4 Drawing Sheets

PORTABLE METEOROLOGICAL INFORMATION SYSTEM

BACKGROUND OF THE INVENTION

1. Field of the Invention (Technical Field)

The present invention relates generally to systems for providing meteorological information, particularly to apparatuses for supplying weather data to aircraft pilots, and specifically to a receiver and calculator apparatus for simultaneously receiving, processing, and displaying weather and other data to pilots of private aircraft.

2. Background Art

Historically, pilots of private aircraft have relied on a wind sock viewed from 1,000 to 1,500 feet while flying over a private airfield or heliport to determine wind speed and direction. More recently, in airports having tower operations or a fixed base operator, aircraft pilots have used radio voice communication with operators at the airport to obtain important weather information, including wind speed and direction. Within the last fifteen years at public airports in the United States, the federal government has installed automated weather observation systems (AWOS). AWOS measure airport weather conditions, and then broadcast periodically updated voice recordings to transmit the information to aircraft near the airport. This system was recently upgraded to a more sophisticated Automated Surface Observing System (ASOS) at the 1,000 largest public U.S. airports. The ASOS system provides a variety of weather information via voice radio communication to aircraft in the vicinity of the airport. Such automated systems can cost anywhere from $30,000 to $150,000 per airport. Both AWOS and ASOS require aircraft pilots to process audible (voice message) information from a radio receiver in the aircraft. There are about 5500 public airports in the United States that should have automatic weather systems provided by the federal and local government to facilitate air safety for public air transportation. However, there are an additional 13,200 private airstrips, heliports, and seaplane bases that, due to cost constraints, will not be instrumented via these federal programs. There is a need, therefore, for a low cost, reliable, alternative system.

Meteorological information is important, of course, to pilots of small aircraft. Such weather factors as crosswind and headwind speed and direction, wind gust speed and direction, and dew point temperature inform the pilot's judgment, particularly during takeoff and landing. The pilot operating out of a small private airport may, at best, obtain some basic absolute wind speed and direction, barometric pressure, and temperature information from automated audio broadcasts from the facility, or from live audio radio communication from the fixed-base facility operator. At numerous remote airstrips, the pilot must still rely upon a wind sock, or upon regional weather reports. Still, even voice communications from a fixed base operator or automated broadcast leave the pilot with the task of referring to printed graphs, charts, and nomographs, and operating handheld standard electronic calculators, or maybe even performing handwritten calculations, to determine from raw audio data such other vital information as cross wind and headwind speeds and directions, dew point temperature, and the like. Still further, the pilot should use the meteorological information thus determined to evaluate whether a takeoff or landing can be safely performed in his particular type of aircraft, under the given weather conditions, on a particular runway. Performing the task correctly is important, and desirably is not undertaken simultaneously with flying the aircraft and listening to the radio. Even when an assistant is available to perform the calculations, the opportunity for human error suggests the desirability of an apparatus which simplifies the task and minimizes error. A need remains, therefore, for a system and apparatus for receiving raw meteorological data and calculating therefrom additional derived meteorological and related information useable by a pilot, without the pilot having to be distracted while operating the aircraft itself. Against this background, the present invention was developed.

SUMMARY OF THE INVENTION
(DISCLOSURE OF THE INVENTION)

The invention relates to an apparatus for assisting pilots and others in easily and rapidly obtaining accurate raw and calculated meteorological data for use in making judgments in the course of flying an airplane, helicopter, or other aircraft. Broadly described, the invention is a receiver-calculator unit, useable in combination with a ground-based weather station transmitter. The unit preferably is portable, so that it can be removably placed in an aircraft, or be hand-held outside the aircraft, or be moved from aircraft to aircraft. Disposed within the unit housing are signal receiver components and electronic calculation components of generally known construction. A central processing unit in the unit permits the processing of data transmitted from the ground-based station to calculate additional useful derived meteorological information for viewing upon a unit display.

The ground-based transmitter obtains raw meteorological data from various measurement devices on the station, and also may be programmed to transmit certain site-specific physical data, such as runway length, runway altitude, and other information useful to a pilot's decision making. The transmitter transmits signals conveying the raw data concerning meteorological conditions at the ground-based station, as well as site-specific information, to a signal receiver disposed inside the unit housing. Digitized raw meteorological data is then transferred electrically from the receiver to the central processing unit, which calculates derived meteorological information at least in part from the raw meteorological data accepted from the signal receiver. The invention also includes some means for the operator to manually input into the CPU site-specific physical data of interest. In the case of airstrips, this physical data usually and preferably includes information about the runway, most particularly the heading (directional layout with respect to north) of the runway, or runway altitude or runway length. The site-specific physical data, such as runway heading, is a variable that also may be manipulated within the CPU to generate derived meteorological information.

The invention preferably includes at least some digital memory for storing both raw and input data as well as derived data. The memory is in communication with the CPU, so that data may be placed into and retrieved from memory by the CPU according to known digital calculation processes. Raw meteorological data from the receiver may be sent straight through for viewing upon the display on the unit, and/or may be sent to storage memory for later recall and processing. Likewise, physical data input from the data input may be stored for later processing in the CPU.

A primary object of the present invention is to provide an economical system and apparatus, useable at small, isolated, unstaffed, or private airports, for readily providing pilots with very local meteorological data and information.

A primary advantage of the present invention is that it can be economically manufactured.

Another advantage of the invention is that it frees a pilot flying an aircraft from having simultaneously to listen to audio weather broadcasts, if they are even available, and from having to fumble with charts, slide rules, conventional arithmetic calculators, and pencils and paper, in order to obtain weather data for use in flying the aircraft or making pre-flight decisions.

Accordingly, there is provided in accordance with the invention an apparatus useable in combination with a ground-based weather station, the station transmitting signals conveying raw data concerning meteorological conditions at the station, the apparatus comprising a signal receiver for receiving the transmitted signals, a central processing unit for calculating derived meteorological information at least in part from the raw meteorological data accepted from the signal receiver, and means for displaying the raw meteorological data and the derived meteorological information. Preferably, site-specific physical data also is conveyed from the ground-based station to the signal receiver. Preferably, the signal receiver comprises a radio receiver. The raw meteorological data may comprise one or more members selected from the group consisting of temperature, relative humidity, average wind speed, average wind direction, wind gust speed, and wind gust direction, while the derived meteorological information comprises at least one member selected from the group consisting of density altitude and dew point temperature. When the ground-based station is at an airport runway, there is provided some means for inputting into the central processing unit site-specific physical data regarding the runway, such as runway heading, altitude, and length. In alternative embodiments, there maybe means for inputting data concerning aircraft performance characteristics particular to the aircraft in use. When the ground-based station is at a golf course, there is provided some means for inputting into the central processing unit physical data respecting a fairway, and the derived meteorological information further comprises crosswind speed. At airports, the derived meteorological information may comprise crosswind speed and/or headwind speed. The means for displaying data comprises at least one member selected from the group consisting of light-emitting diodes and liquid-crystal displays.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The invention has to do with a system and apparatus for supplying meteorological information in a readily usable form to persons, particularly small aircraft pilots. The invention may be adapted for use in other fields of endeavor, for example boating and golf, where weather conditions, and the directional relationship between wind direction and local features (such as direction of sailboat travel or layout of a golf course fairway), are important factors. It is contemplated, however, that the invention finds utmost utility in the field of aviation. Operators of small private aircraft, especially non-commercial airplanes (commonly called "general aviation"), but also including helicopters and even hot air balloons, may utilize the invention. The apparatus permits the pilot to more reliably and safely receive and utilize weather information to perform flight maneuvers, most particularly take-offs and landings, at small private airfields, heliports, and seaplane bases.

Figure 1:
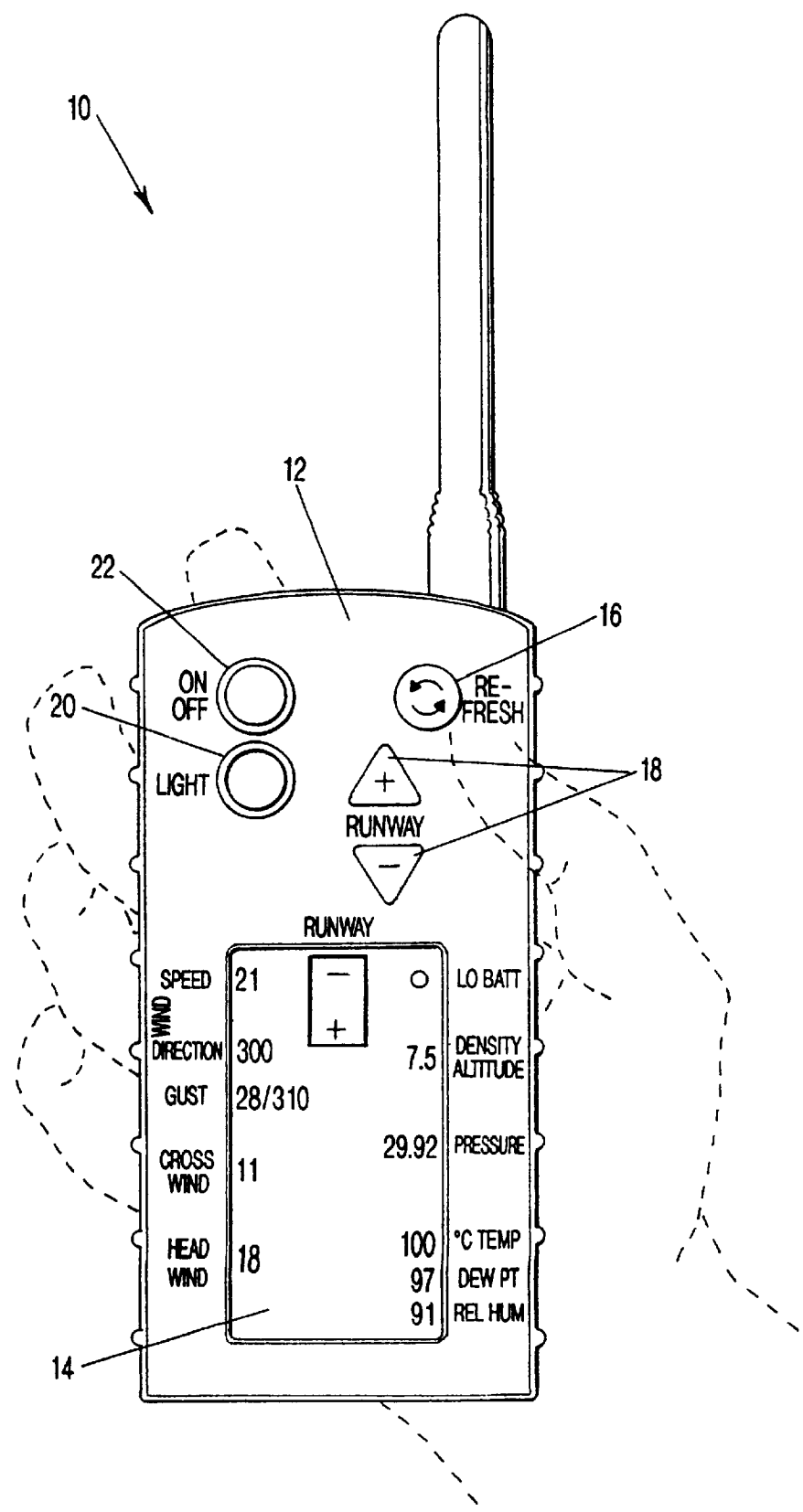
FIG. 1 is a perspective view of one embodiment of the portable receiver-calculator unit according to the invention, held in a user's hand.

Attention is invited to FIG. 1, showing the receiver unit apparatus 10 of the invention, shown being held in a user's hand. The apparatus 10 preferably is sized to be readily portable (for example for transfer from airplane to airplane), but may be larger than the scale depicted in the figures. Alternatively, the apparatus 10 may be permanently mounted within an aircraft. The receiver unit 10 has a housing 12 composed of plastic or other rigid, durable material suitable for containing and protecting a signal receiver, preferably a radio receiver, and computer processing components. Housing 12 maybe provided with connectors (not shown) thereon, such as brackets, VELCRO® fastener strips, or the like, with which the unit 10 can be releasably and temporarily engaged with complementary mounts or fasteners upon the control panel or other convenient part of the aircraft cockpit. Ideally, the housing 12 can be opened to permit access to interior components for replacement and repair.

The face of the housing 12 of the receiver and processor unit 10 features a display 14 where useful data is displayed to the user. Data display preferably is accomplished by conventional liquid-crystal display (LCD) or light-emitting diode (LED) components, which permit data collected and processed by the unit 10 to be viewed by the user. Also on the unit 10 are various buttons or switches for operation, including an a information refresh button 16, a runway heading setting button 18, a display light button 20, and an on-off switch 22, to be described. The unit 10 has a conventional power source (not shown), which may be an internal battery and/or an input from the aircraft's electrical system.

Figure 3:
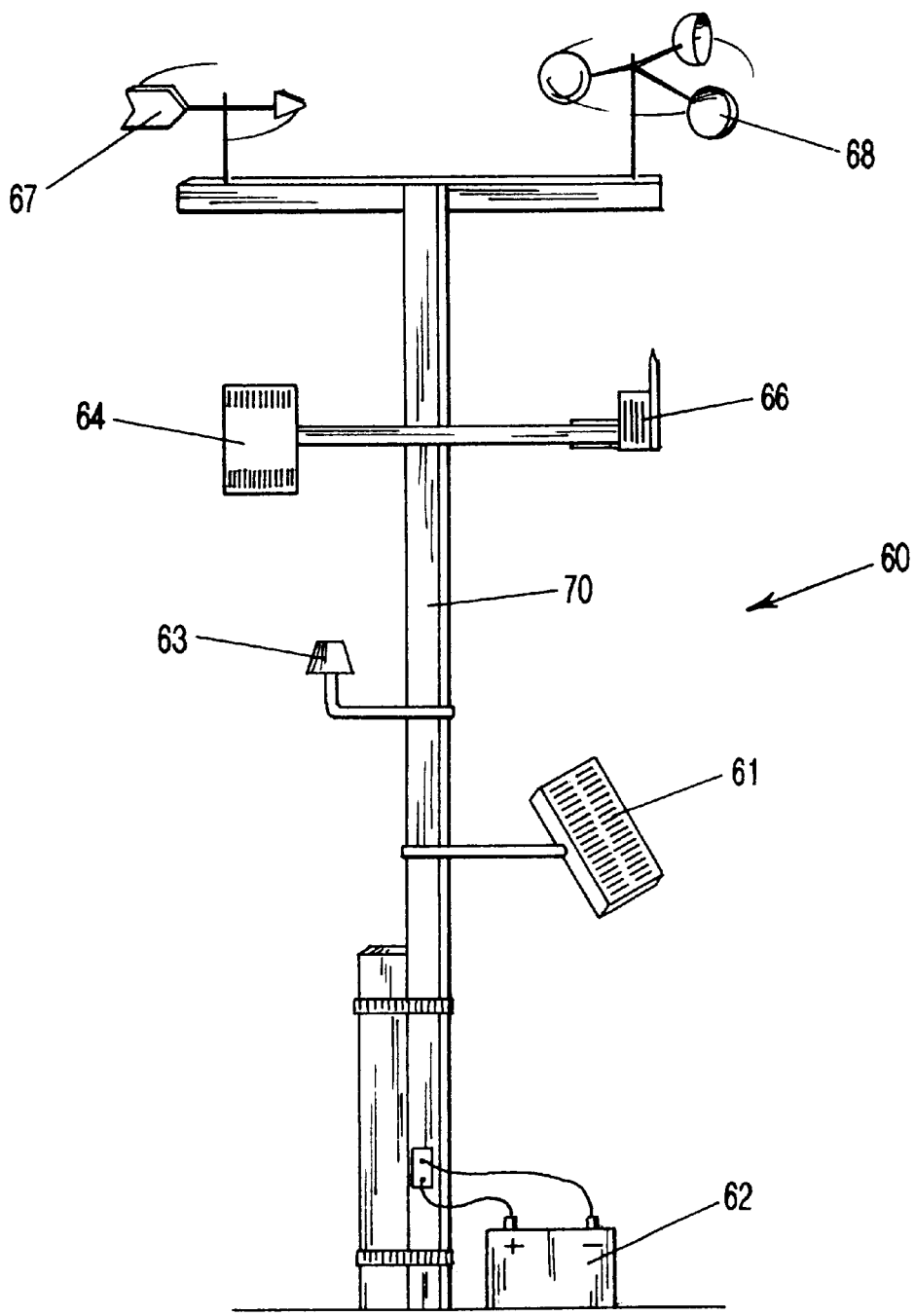
FIG. 3 is an elevation view of the ground-based weather station useable with the present invention.

FIG. 3 shows a ground-based automated weather station 60 used with the inventive system. The weather station 60 is situated at the landing strip or airport, and employs known technologies automatically to gather fundamental meteorological information for periodic transmission to the receiver-processor unit 10. The station 60 is fixed, as to a building or to a pole 70, to be in a stationary but elevated position upon the ground. The station 60 is provided with a source of electrical power, such as a battery 62. Interconnection between the various components of the station 60 optionally may be provided by sheltering wiring and cables within the hollow pole 70. The battery 62 may be rechargeable by an electrically connected conventional solar energy collector panel 61, e.g. photovoltaic cells. Alternatively, the station 60 may be powered by connection to the public utility grid via a transformer, etc.

The station 60 has a pressure and humidity module 64 containing a barometer and hygrometer. Real-time data regarding barometric pressure and relative humidity at the station 60 are obtained at the pressure and humidity module 64. The barometric and hygrometric data is provided to a radio transmitter 66 for transmission to aircraft in the vicinity (e.g. within about two miles radius and under 2,000 feet above ground level). Transmitter 66 broadcasts raw weather data at a suitable approved frequency, for example between about 900 megahertz and about 2.3 gigahertz. Transmitter 66 also may be pre-programmed to transmit site-specific physical data about the runway (length, altitude, and the like). Transmitter 66 may include modest digital signal processing and other elements, for example amplifiers, for pre-processing received data prior to its broadcast from the transmitter 66. Similarly, transmitter 66 preferably includes a timing circuit of known construction whereby transmission of updated collected meteorological data occurs at periodic intervals, for example every ten seconds.

Other data gathering instruments in the station 60 include a thermometer module 63 having one or more thermometers for measuring ambient air temperature at the station 60. Preferably, thermometer module 63 has at least one centigrade and one Fahrenheit thermometer, and can be either digital or analog. Temperature data is sent to the transmitter 66 to then be transmitted to the receiver unit 10. Mounted near the top of the station 60 are a vane 67 and anemometer 68, for obtaining real-time measurements of wind direction and speed. Simple microprocessors at the station 60, for example housed with the transmitter 66, process input from the vane 67 and from the anemometer 68 to determine average wind speed and average wind direction in a generally conventional manner according to the following formulae:

For average wind speed:

$$V_{AVG} = \sum_{V_1}^{V_N} V_\chi / N \text{ for 2 minutes} \quad (1)$$

and for average wind direction:

$$D_{AVG} = \sum_{D_1}^{D_N} D_\chi / N \text{ for 2 minutes} \quad (2)$$

The average wind speed and direction are sent to the transmitter 66 for transmission to the receiver in the unit 10. Also accompanying the transmitter 66 preferably is a gust calculator (not shown). The gust calculator uses known means and methods for determining the peak (maximum) wind speed over each one of serial, successive, prescribed (e.g. two-minute) intervals, and the wind direction at the instant of each interval's maximum gust. The peak gust speed and direction thereof is then transmitted by the transmitter 66. The maximum gust speed and direction information is updated and broadcast at regular (e.g. two minute) intervals. Similarly, the dew point temperature at the station 60 may be calculated by processors at the station according to formula (3) hereinafter for transmission to and display at the unit 10, or dew point may be calculated in the unit itself as described hereafter. The overall instrumentation, configuration, and function of the private weather station 60 is within the known arts, but its integration into the complete system of the invention is believed to be innovative.

Figure 4:
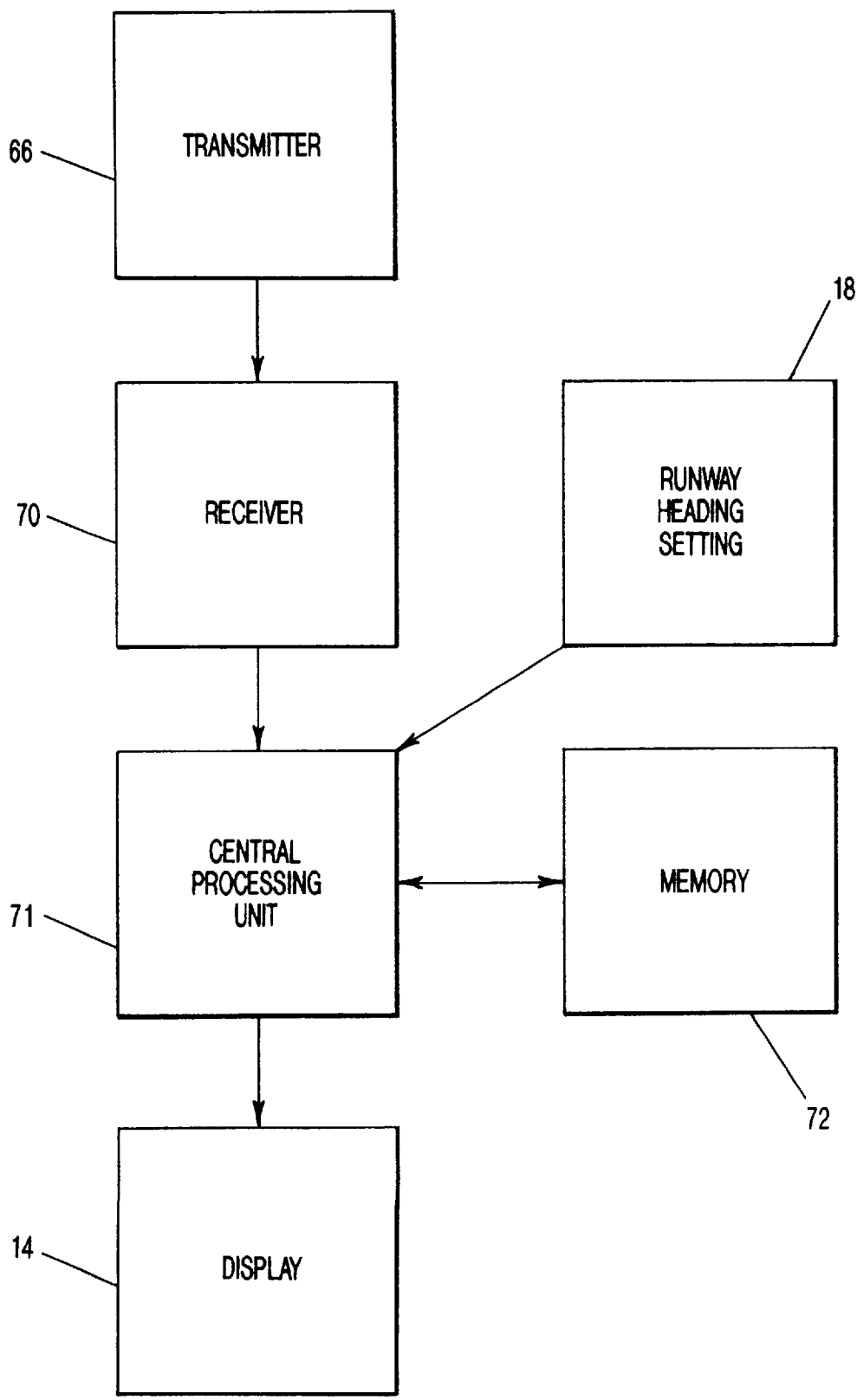
FIG. 4 is a schematic diagram illustrating the interaction of various elements of the apparatus of the invention.

The general construction and function of the invention is indicated in FIG. 4. The unit containing the receiver 70 and central processing unit 71 is disposed within the aircraft. The transmitter 66 obtains raw meteorological data from the various modules of the station 60. Raw meteorological data includes, for example, temperature, relative humidity, average wind speed, average wind direction, wind gust speed, and wind gust direction, as explained above. The transmitter 66 transmits signals conveying raw data concerning meteorological conditions at the station 60 to a signal receiver 70, disposed inside the housing 12, for receiving the transmitted signals. The transmitter 66 preferably is a radio transmitter of comparatively modest wattage, and the receiver 70 preferably is a radio receiver of known construction.

Digitized (as by a standard analog-digital converter) raw meteorological data is then transferred electrically from the receiver 70 to a central processing unit (CPU) 71 which also is disposed within the housing 12 of the unit 10. The CPU 71 is a digital computer for calculating derived meteorological information at least in part from the raw meteorological data accepted from the signal receiver 70. The CPU processes the raw data using algorithms, to be further explained, to determine derived meteorological information. Derived meteorological information is information concerning weather conditions that are not directly measured at the station 60, but rather is derived from mathematical processing of raw input data. Derived meteorological information includes, for example, density altitude, and dew point temperature. The invention also includes some means for the operator to input into the CPU 71 physical data respecting the topography of interest. In the case of airstrips, this physical data usually and preferably includes information about the runway, most particularly the heading (directional layout with respect to north) of the runway. Alternatively, physical information to be input in other fields of use includes, for example, the heading of a golf course fairway. In the preferred embodiment, the physical data about the runway or fairway heading is input using the runway heading setting button 18, which is operatively electronically connected with the CPU 71. The physical data, such as runway heading, is a variable that also may be manipulated within the CPU 71 to generate derived meteorological information. For example, the runway heading value can be mathematically processed, together with the average wind speed and direction received from the receiver 70, in the CPU to calculate the crosswind and headwind values at the runway. Thus, derived meteorological information also optionally includes information based on a combination of raw meteorological data and data input by the operator regarding physical or topographical character of a runway or golf course fairway.

As shown in FIG. 4, the invention preferably includes at least some digital memory 72 for storing both raw and input data as well as derived data. The memory 72 is in communication with the CPU 71, so that data may be placed into and retrieved from memory by the CPU according to known digital calculation processes. Raw meteorological data from the receiver 70 may be sent straight through for viewing upon the display 14 on the unit 10, and/or may be sent to storage memory 72 for later recall and processing. Likewise, physical data input from the data input 18 may be stored for later processing in the CPU 71. The operator sets the physical data input values by referring to values that are "dialed" upon the display 14. Derived meteorological information rendered in the CPU 71 are sent from the CPU for viewing by the user upon the display 14. The display 14 on the unit housing 12 preferably is an arrangement of a plurality of liquid-crystal or light-emitting diode display components in electronic communication with the CPU 71.

In sum, the unit 10 is a combined signal receiver and calculator. Disposed within housing 12 are signal receiver components (preferably a radio receiver 70) and electronic calculation components, i.e. the CPU 71, of generally known construction. The CPU, which accesses the comparatively modest memory 72 but preferably features a high clock speed, is within the unit housing 12. The CPU 71 permits the processing of data transmitted from the station 60 to calculate additional useful derived meteorological information for viewing upon the display 14.

Figure 2:
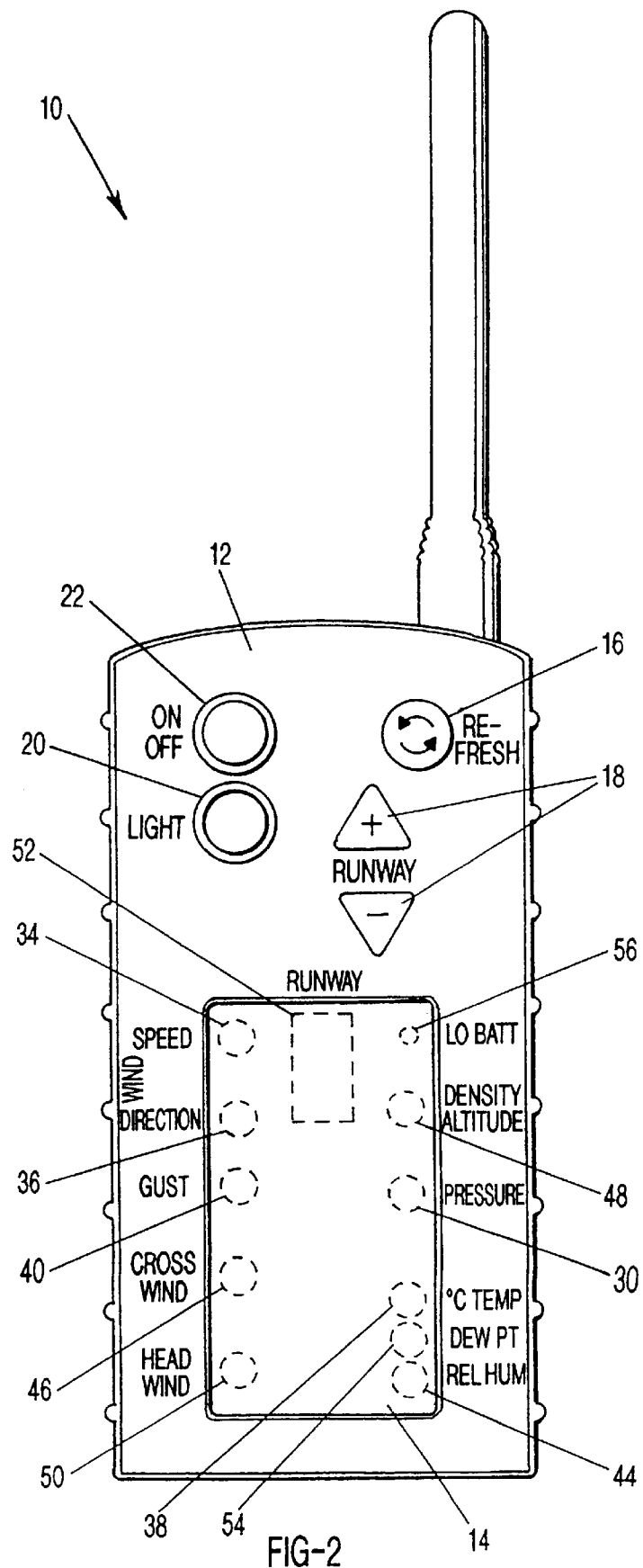
FIG. 2 is a front view of the embodiment shown in FIG. 1.

Attention is returned to FIGS. 1 and 2. The on-off switch 22 on unit 10 preferably is an ordinary toggle switch for actuating and deactivating the unit 10, for example by connecting or disconnecting the unit's power supply. A refresh button 16 clears from the unit's immediate memory 72 any data previously received from the transmitter 66 at the private station 60. The unit's memory 72, once purged by the depression of the refresh button 16, is freed to receive and digitally store updated raw meteorological data more recently transmitted from the transmitter 66 and received by the receiver 70, which in turn permits the internal CPU 71 to run another iteration of calculations to generate derived meteorological information. The unit 10 in more sophisticated embodiments may be provided with a plurality of memories, whereby aged data may be retained in secondary non-immediate storage while most recently received data from the station 60 is processed and displayed for use. A display light button 20 activates a small display light to permit viewing of the display 14 in dark conditions, particularly for embodiments using an LCD type of display screen. The runway heading setting button 18 is a switch of known construction whereby the user is able to input the heading (in degrees) of the runway of interest. By depressing the "plus" side of the button 18, the runway heading figure indicated in the runway heading section 52 of the display 14 is incrementally increased; likewise, depressing the "minus" side of the toggle, the runway heading value is decreased. The runway button 18 thus permits the user to select an appropriate value for the runway heading, between zero and 360 degrees, to be processed in the CPU 71. For example, a runway heading of nine degrees has been entered for display in FIG. 1.

The unit display 14 has various sections where particular information is displayed to the user. The display sections correspond to indicating labels on adjacent portions of the housing 12. Preferably, each display section has a separate LED or LCD component, so that each display section functions individually in conjunction with the CPU 71. By way of particular exemplary description, combined reference to FIGS. 1 and 2 illustrates that in one embodiment, the dew point temperature display section 54 (displaying 97 degrees in FIG. 1) is adjacent to a "dew point temp" label on the adjoining housing. Alternatively, data-identifying indicia may be supplied directly within the display 14 by electronic or other graphical means.

In the preferred embodiment, the display 14 features a plurality of display sections whereon various items of data are displayed for viewing. As seen in FIG. 2, a wind speed display section 34 is where wind speed (typically in knots), at the anemometer 68 (FIG. 3), is shown. For example, 21 knots is displayed in the wind speed display section 34 of FIG. 1. Wind direction in degrees at the vane 67 is displayed in wind direction display section 36, the direction of 300 degrees shown by example in FIG. 1. Similarly, barometric pressure at the station 60 is displayed in the pressure display section 30, temperature at the station 60 is displayed in the temperature display section 38, the wind gust speed (e.g. maximum for most recent two-minute interval) and direction are viewed in the gust display section 40, and relative humidity at the station 60 is viewed within the humidity display section 44. The foregoing values are raw meteorological data received by signal from the transmitter 66 and displayed directly for viewing by the user. A low battery indicator 56 may be provided to alert the user to an expiring internal battery.

Also viewable on the display 14 is derived meteorological information generated by the unit 10 by processing the raw meteorological data sent from the station 60. The direct cross wind speed (in knots, for example) at the airport runway, or more specifically, at the station 60 very near the runway, is displayed in cross wind display section 46. "Cross wind" is the component of wind speed blowing perpendicular to the runway. Similarly, the head wind at the runway appears in the headwind display section 50. Head wind is that fractional component of the total wind speed that blows parallel to the runway (with aircraft typically landing "into" the wind). An advantage of the invention is that it provides the pilot with crosswind and head wind information rapidly and effortlessly, despite the fact that the actual direction of the wind normally is at some non-orthogonal direction with respect to the runway. Density altitude is shown in the density altitude display section 48. "Density altitude" has the meaning assigned in the field of aviation, and is a measurement of air density in terms of altitude, but also as affected by temperature, humidity, and barometric pressure. For example, air density at an air strip located on a 7,000-foot plateau differs from air density at sea level, and density altitude at either location can vary due to changes in local air temperature, pressure, and humidity. Information is separately presented in each of the distinct display sections 30–54 by LCD or LED display components in signal communication with the internal CPU 71 and storage memory 72 components of the unit 10.

The CPU 71 within the housing 12 utilizes digital programming to determine several items of is derived information from the raw data transmitted from the station 60. Dew point, for example, is determined from the relative humidity and temperature data received by the receiver 70 from the station transmitter 66. Temperature data and relative humidity information is transmitted to the unit 10 from the station. The relative humidity is directly displayed in the relative humidity display section 44, and the temperature likewise is displayed immediately in the temperature display section 38. The CPU 71 accepts the temperature and relative humidity data from the receiver 70, and determines the local dew point. First, the dew point temperature in degrees centigrade is calculated from the following algorithm $$DP(°C.) = 238.3/(1/N - 1) \qquad (3)$$

$$\text{Where: } N = \left[\ln\left(\frac{RH\%}{100}\right) \times \frac{1}{17.2694}\right] + \left[\frac{T(°C.)}{T(°C.) + 238.3}\right]$$

And where RH % is the relative humidity measured by the pressure and humidity module 64 and transmitted by the transmitter 66, and T is the temperature in degrees centigrade measured at the thermometer module 63 and transmitted. In is the natural log. The dew point in degrees Fahrenheit is then determined from the metric dew point determined from Equation (3), according the formula $$DP(F°) = \tfrac{9}{5} DP(°c.) + 32 \qquad (4)$$

The dew point in degrees Fahrenheit is then sent to the dew point display section 54 where it is available for viewing by the user. Dew point temperature can be used by pilots to ascertain valuable information about altitude (both of the aircraft and of clouds) due to known temperature lapse rates and pressure decreases attributable to increases in altitude.

The CPU 71 also accepts raw atmospheric pressure and temperature data from the receiver 70 to determine the density altitude value for use by the pilot. Raw barometric pressure data is displayed directly in the pressure display section 30 for viewing. Density altitude (to 12,000 feet) is determined in the CPU 71 from the following algorithm:

$$h = (11{,}346 - 148{,}300\rho)/(0.37921 - \rho) \qquad (5)$$

Where: $\rho = (P)(M)/(R)(T)$
$= P(29)/(21.85)(T_F + 460)$
Where: $\rho$ = Atm pressure in inches Hg
$T_F$ = Temperature in ° F.

The calculated density altitude value is then sent to the density altitude display section 48 for viewing. Density altitude is used to determine aircraft landing and take-off characteristics as a function of aircraft weight. The CPU 71 may be programmed with known formula for determining these aircraft-specific characteristics.

Information about crosswind and headwind is of tremendous value to the pilot. The invention provides crosswind and headwind data to the pilot by permitting the pilot to enter into the CPU 71 specific topographic information about the airport, specifically the directional heading of the runway to be used. Prior to takeoff or landing, the pilot selects or is instructed which of more than one available runway will be used; more commonly, private airstrips have a single runway. With the runway identified, the pilot employs the runway heading setting button 18 to input the heading of the runway into the CPU 71. The runway heading is previously known from maps, compass, or information from an airport fixed base operator, for example. The user repeatedly depresses (or otherwise actuates) the appropriate side of the dual-contact runway heading setting button 18 to increase or decrease the value displayed in the runway heading display section 52 until the proper corresponding runway heading value is indicated. The runway position information then is available to the CPU 71. When the correct runway heading appears in the runway heading display section 52, the runway heading data may be sent to the CPU 71 and/or memory 72 by, for example, depressing the entire button 18 (as distinguished from the dual sided button action).

With the runway heading entered by the user into the CPU 71, the unit 10 is able to determine vital headwind and crosswind information from the wind speed and direction data received from the transmitter 66 (and perhaps previously placed in memory 72). Raw data about wind speed (knots) and direction (heading degrees) is available from the receiver 70 or memory 72 for display directly upon the wind speed display section 34 and wind direction display section 36, respectively. This wind speed and direction information is manipulated, in combination with the input runway heading value, and converted by the CPU into useable derived headwind and crosswind data according to the following algorithms:

For crosswind speed:

$$\text{Crosswind speed: (Knots)} V_{cw} \qquad (6)$$

$V_{cw} = V_w[\sin(D_{rw} - D_w)]$
Where: (+) If Left Wind, (−) If Right Wind
$V_{cw}$ = Wind Speed, (Knots), $D_{rw}$ = Runway Heading
$D_w$ = Wind Heading
and for headwind speed:

$$\text{Headwind Seed: (Knots)} V_{HW} \qquad (7)$$

$V_{HW} = V_w[\cos(D_{rw} - D_w)]$
Where: (+) Headwind, (−) Tailwind
$V_w$ = Wind Speed, (Knots), $D_{rw}$ —Runway Heading
$D_w$ = Wind Heading An exemplary use of the invention may now be summarized. The airport, or other alternative facility of interest such as a marina or golf course, is provided with the ground-based weather station 60 depicted in FIG. 3. The transmitter 66 periodically transmits radio signals conveying raw data concerning meteorological conditions at the station 60. The user, such as an aircraft pilot, approaches the airstrip in an aircraft whose cockpit is equipped with the unit 10 depicted in FIGS. 1 and 2. The pilot turns the unit on by actuating the on-off switch 22. Signals conveying raw meteorological data are received from the transmitter 66 by the receiver 70 for transfer to the CPU 71 and/or the unit memory 72. In the event of cockpit darkness, the pilot may actuate the display light button 20 if required.

The raw meteorological data is displayed in the display 14. Current average winds speed is viewed at the wind speed display section 34, while current average wind direction is viewed in the wind direction display section 36. (Barometric pressure is used by a pilot to set the aircraft barometric altimeter to local barometric pressure.) The barometric pressure at the station 60 appears in the pressure display section 30. The ambient temperature is displayed in the temperature display section 38. Relative humidity is available for viewing in the humidity display section 44. The pilot also may view the gust speed and direction, as transmitted from the station 60, in the gust display section 40. The pilot may, if desired and possible, make certain aircraft operation decisions and plans based upon the foregoing raw meteorological data. Continuing, the pilot inputs the runway heading value using the runway heading setting button 18 so that the runway heading value appears in the runway display section 52. The entire runway heading setting button is depressed to send the runway heading data to the CPU 71. The CPU 71 engages microprocessors which retrieve the appropriate values of the respective raw meteorological data, and apply the algorithms set forth at Equations 3–7 herein, to calculate derived meteorological information, such as cross wind speed, headwind speed, density altitude, and dew point temperature. The derived meteorological information is displayed in respective ones of the display sections 46, 50, 48, and 54 where they may be viewed by the pilot operator. Notably, the pilot does not have to manipulate any slide rule, refer to any graphs, or operate a standard electronic calculator. The derived meteorological information is automatically generated and displayed for use in flying the airplane. In the event the pilot does not make immediate use of the received and calculated data, for example, in the event the airstrip is circled for a period of time, the pilot can update all the data in preparation for landing. The runway heading setting button is not used again, since the runway position is unchanged. The pilot simply pushes the refresh button 16, at which time the receiver 70 receives signals conveying updated raw meteorological data, and the CPU 71 reruns the algorithms to generate updated derived meteorological information. The updated information may then be used to properly configure the aircraft for landing.

In sophisticated embodiments of the invention, the CPU in the unit 10 maybe pre-programmed with data (aircraft empty weight, take-off distances at standard conditions, and the like) customized to the particular model of aircraft in which it is to be used. Also, the unit 10 may be provided with an input whereby the pilot inputs not only the runway heading, but also runway length. Also, an input button, similar to runway heading input button 18, may be provided whereby the pilot may input the weight of passengers and cargo. In these advanced versions of the invention therefore, a safety program is provided in the CPU so that, in the event that the current meteorological conditions at the runway (as received and calculated by the unit 10) preclude a safe landing or take-off by the type/weight of aircraft in use, a visual and/or audible alarm is activated on the unit 10.

For example, the CPU 71 may be custom-programmed to contain the take-off characteristics (such as required runway length) of the specific aircraft in use, when supplied with real-time data about density altitude and passenger/cargo weight. Such characteristic algorithms are known in the art, and their installation into a CPU is within the ordinary skill of computer programmers. Thus, the operator of the invention may take the apparatus of the invention prior to take-off, and use it to ascertain the safety of a proposed take off. The unit 10 receives transmitted raw meteorological data (e.g., temperature and pressure) from the transmitter 66, and determines, stores, and displays the calculated density altitude. The unit 10 also receives and stores site-specific physical data, such as runway heading and length, broadcast by the transmitter 66, or the pilot alternatively inputs such site-specific data into the CPU 71 using buttons similar to the runway heading setting button 18. The unit 10 derives cross and head wind data as previously described. The pilot inputs the weight of cargo and passengers into the CPU as additions to total aircraft weight. The CPU 71 then enters the density altitude value, headwind value, runway length, aircraft weight, and other pertinent variables into the pre-programmed aircraft performance algorithms, and determines if a safe take-off may be performed under the particular conditions. If safety is questionable, an audible and/or visible alarm is activated.

In alternative embodiments, the invention is used at golf courses. The station 60 is installed at a central location at the course. A unit 10 is carried by a golfer, who can input the physical data (e.g. heading) of a fairway, and then operate the unit 10 to provide wind speed and directions, including cross winds and headwinds, helpful in evaluating the swing necessary to compensate for the ambient conditions'effects on the flight of the ball.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus useable in combination with a ground-based weather station, wherein the ground-based station is at an airport runway, the station transmitting signals conveying raw data concerning meteorological conditions at the station, said apparatus comprising:

a signal receiver for receiving the transmitted signals;

a central processing unit for calculating derived meteorological information at least in part from the raw meteorological data accepted from said signal receiver;

means for inputting into said central processing unit physical data respecting the runway, said physical data selected from the group of site-specific data consisting of runway length, runway altitude, and runway heading; and means for displaying the raw meteorological data and said derived meteorological information.

2. An apparatus according to claim 1 wherein said signal receiver comprises a radio receiver.

3. An apparatus according to claim 2 wherein the raw meteorological data comprises at least one member selected from the group consisting of temperature, relative humidity, average wind speed, average wind direction, wind gust speed, and wind gust direction.

4. An apparatus according to claim 3 wherein said derived meteorological information comprises at least one member selected from the group consisting of density altitude and dew point temperature.

5. An apparatus useable in combination with a ground-based weather station, wherein the ground-based station is at a golf course, the station transmitting signals conveying raw data concerning meteorological conditions at the station, said apparatus comprising:

a signal receiver for receiving the transmitted signals;

a central processing unit for calculating derived meteorological information at least in part from the raw meteorological data accepted from said signal receiver;

means for inputting into said central processing unit physical data respecting a golf course fairway, said physical data comprising fairway heading; and means for displaying the raw meteorological data and said derived meteorological information, wherein said derived meteorological information compress crosswind speed.

6. An apparatus according to claim 1 wherein said derived meteorological information further comprises at least one member selected from the group consisting of crosswind speed and headwind speed.

7. An apparatus according to claim 2 wherein said means for displaying comprises at least one member selected from the group consisting of light-emitting diodes and liquid-crystal displays.

8. An apparatus useable in combination with a ground-based weather station at an airport runway, the station transmitting signals conveying raw data concerning meteorological conditions at the station, said apparatus comprising:

a signal receiver for receiving the transmitted signals conveying raw meteorological data;

means for inputting into a central processing unit physical data respecting the runway, wherein said central processing unit calculates derived meteorological information from the raw meteorological data accepted from said signal receiver and from said physical data respecting the runway;

means for displaying the raw meteorological data and said derived meteorological information.

9. An apparatus according to claim 8 wherein said signal receiver comprises a radio receiver.

10. An apparatus according to claim 8 wherein the raw meteorological data comprises at least one member selected from the group consisting of temperature, relative humidity, average wind speed, average wind direction, wind gust speed, and wind gust direction.

11. An apparatus according to claim 8 wherein said derived meteorological information comprises at least one member selected from the group consisting of density altitude and dew point temperature.

12. An apparatus according to claim 8 wherein said derived meteorological information further comprises at least one member selected from the group consisting of crosswind speed and headwind speed.

13. An apparatus according to claim 8 wherein said means for displaying comprises at least one member selected from the group consisting of light-emitting diodes and liquid-crystal displays.

14. An apparatus according to claim 8 wherein said means for inputting into a central processing unit comprises a data input button.

15. An apparatus according to claim 8 wherein said means for inputting into a central processing unit comprises said signal receiver for receiving transmitted signals conveying said physical data.

16. An apparatus useable in combination with a ground-based weather station at a site, the station transmitting signals conveying raw data concerning meteorological conditions at the station, said apparatus comprising:

a signal receiver for receiving the transmitted signals;

a central processing unit for calculating derived meteorological information at least in part from the raw meteorological data accepted from said signal receiver;

means for inputting into the central processing unit site-specific physical data respecting the site;

means for displaying said site-specific physical data, said raw meteorological data, and said derived meteorological information.

17. An apparatus according to claim 16 wherein said central processing unit calculates derived meteorological information from the raw meteorological data accepted from said signal receiver and from said site-specific physical data.

18. An apparatus according to claim 17 wherein said site is an airport runway and wherein said apparatus is disposable within a selected aircraft, and wherein said central processing unit is programmed with data regarding the selected aircraft and regarding safe take-off or landing meteorological conditions for the selected aircraft; said apparatus further comprising:

means for inputting the weight of passengers and cargo to be carried in the selected aircraft; and an alarm;

wherein when said derived meteorological conditions at the runway preclude a safe landing or take-off by the selected aircraft, said alarm is activated.

19. An apparatus according to 16 wherein said site is a golf course.

* * * * *